(12) United States Patent
Simburg et al.

(10) Patent No.: US 10,354,327 B2
(45) Date of Patent: Jul. 16, 2019

(54) TRANSMITTING DATA TO SELECT USERS (71) Applicant: eBay Inc., San Jose, CA (US)

(72) Inventors: Stephen Simburg, Seattle, WA (US);
Jian Zhang, Bellevue, WA (US);
Mingyuan Zhong, Sunnyvale, CA (US)

(73) Assignee: eBay Inc., San Jose, CA (US)

( * ) Notice: Subject to any disclaimer, the term of this patent is extended or adjusted under 35 U.S.C. 154(b) by 438 days.

(21) Appl. No.: 15/094,638

(22) Filed: Apr. 8, 2016

(65) Prior Publication Data

US 2016/0300306 A1      Oct. 13, 2016

Related U.S. Application Data

(60) Provisional application No. 62/144,788, filed on Apr. 8, 2015.

(51) Int. Cl.
*G06Q 40/04* (2012.01)
*H04L 29/08* (2006.01)
*G06Q 30/02* (2012.01)

(52) U.S. Cl.
CPC ......... *G06Q 40/04* (2013.01); *G06Q 30/0251* (2013.01); *H04L 67/20* (2013.01); *H04L 67/02* (2013.01)

(58) Field of Classification Search
CPC .... G06Q 40/04; G06Q 30/0255; G06Q 30/00; G06Q 30/0251; G06F 19/00; H04L 67/20; H04L 67/02
See application file for complete search history.

(56) References Cited

U.S. PATENT DOCUMENTS

| 5,848,396 A | * | 12/1998 | Gerace | G06Q 30/02 705/7.33 |
| 2011/0054997 A1 | * | 3/2011 | Feuerstein | G06Q 30/02 705/14.42 |

* cited by examiner

*Primary Examiner* — Namrata Boveja
*Assistant Examiner* — Carol A See
(74) *Attorney, Agent, or Firm* — Shook, Hardy & Bacon L.L.P.

(57) ABSTRACT

In various example embodiments, a system and method for transmitting data to select users are presented. User information corresponding to users of a web service is accessed. Scores for each of the user is calculated based on the accessed user information. Select users of the web service are identified based on the calculated scores. A data object is generated and then transmitted to the select users.

20 Claims, 9 Drawing Sheets

FIG. 9 ized to generate a data object that is transmitted
TRANSMITTING DATA TO SELECT USERS

RELATED APPLICATIONS

This application claims the priority benefit of U.S. Provisional Application No. 62/144,788, entitled "SYSTEMS AND METHODS TO GENERATE A RETARGETING LIST," filed Apr. 8, 2015, which is hereby incorporated herein by reference in its entirety.

TECHNICAL FIELD

Embodiments of the present disclosure relate generally to data processing and, more particularly, but not by way of limitation, to generation of a data object that is transmitted to select users and receiving an assessment of the select users for content from a web service.

BACKGROUND

Conventionally, a group of users may be identified for retargeting. The group of users is either identified manually or using a specific rule. The specific rule may be determined by an administrator of a retargeting process.

BRIEF DESCRIPTION OF THE DRAWINGS

Various ones of the appended drawings merely illustrate example embodiments of the present disclosure and cannot be considered as limiting its scope.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various example embodiments of the subject matter discussed herein. It will be evident, however, to those skilled in the art, that embodiments of the subject matter may be practiced without these specific details.

In various example embodiments a retarget system, as described herein, is capable of sending content to users that have performed an action with respect to a web service. For instance, a user may have browsed a product (e.g., item) that is published by the web service as being available for sale. As another example, a user may have searched for a particular item using the web service. Also, a user having an account with the web service may have provided user data during creation of the account. Each of these actions may be stored as user information in a database. Further, the user information for a variety of users of the web service is stored in the database. The user information may also include demographic information, financial information, and the like. With the user information, the retarget system is able to calculate scores for each of the users. Thereafter, the scores are then used to identify a list of users to receive content related to the web service, such as an advertisement for an item. Subsequently, a publication server will display the content related to the web service to each user from the list of users. Moreover, information about each of the users from the list of users may be received from the publication system. The information may indicate a value of each of the users from the list of users with regards to the effectiveness of the content related to the web service.

Figure 1:
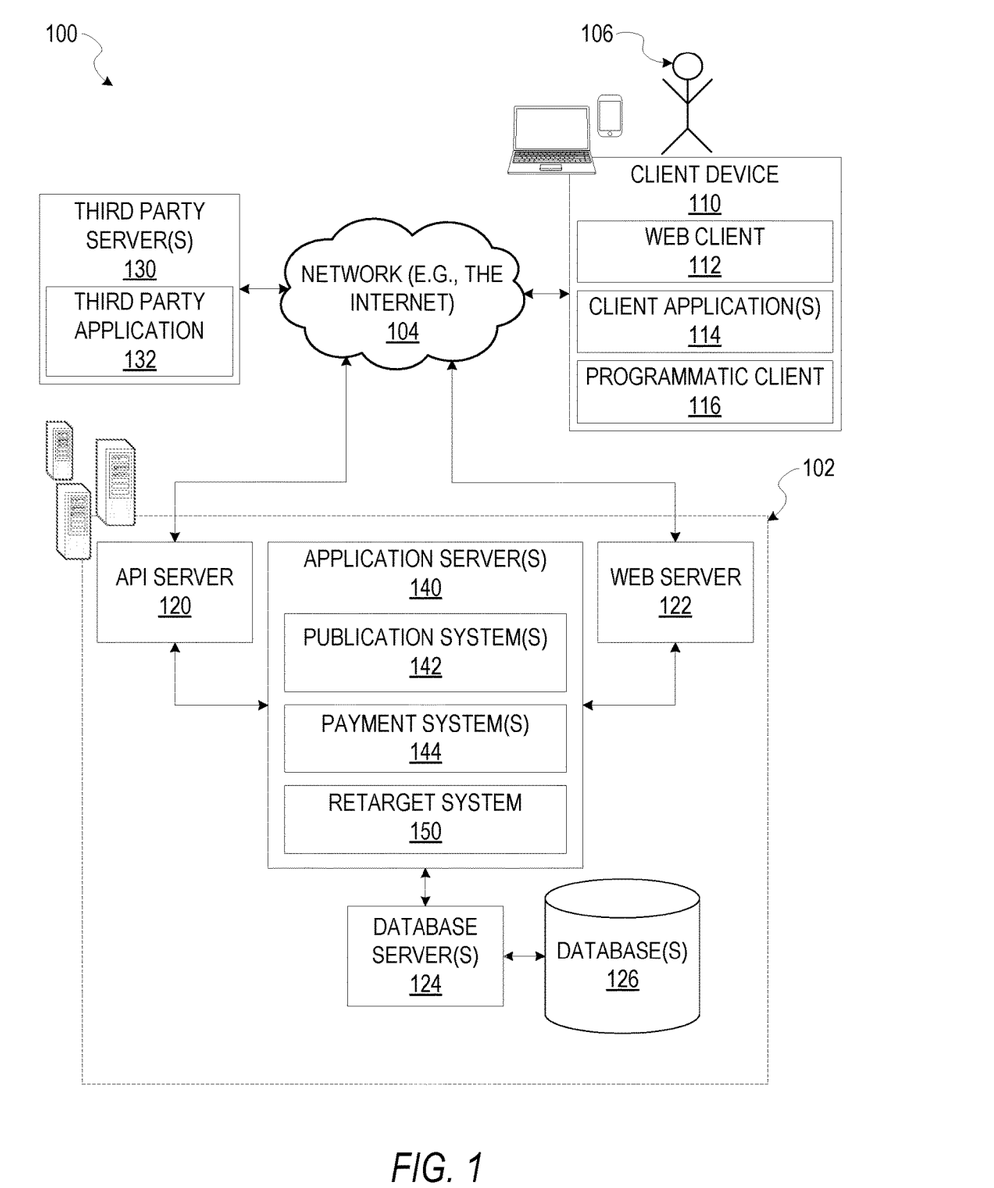
FIG. 1 is a block diagram illustrating a networked system, according to some example embodiments.

With reference to FIG. 1, an example embodiment of a high-level client-server-based network architecture 100 is shown. A networked system 102, in the example forms of a network-based publication or payment system, provides server-side functionality via a network 104 (e.g., the Internet or wide area network (WAN)) to one or more client devices 110. FIG. 1 illustrates, for example, a web client 112, a client application 114, and a programmatic client 116 executing on client device 110.

The client device 110 may comprise, but is not limited to, a mobile phone, desktop computer, laptop, portable digital assistants (PDAs), smart phones, tablets, ultra-books, netbooks, laptops, multi-processor systems, microprocessor-based or programmable consumer electronics, game consoles, set-top boxes, or any other communication device that a user may utilize to access the networked system 102. In some embodiments, the client device 110 comprises a display module (not shown) to display information (e.g., in the form of user interfaces). In further embodiments, the client device 110 may comprise one or more of a touch screens, accelerometers, gyroscopes, cameras, microphones, global positioning system (GPS) devices, and so forth. The client device 110 may be a device of a user that is used to perform a transaction involving digital items within the networked system 102. In one embodiment, the networked system 102 is a network-based publication system that responds to requests for product listings, publishes publications comprising item listings of products available on the network-based publication system, and manages payments for these marketplace transactions. For example, one or more portions of the network 104 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, a wireless network, a WiFi network, a WiMax network, another type of network, or a combination of two or more such networks.

Each of the client devices 110 include one or more applications (also referred to as "apps") such as, but not limited to, a web browser, messaging application, electronic mail (email) application, an e-commerce site application (also referred to as a marketplace application), and the like. In some embodiments, if the e-commerce site application is included in a given one of the client device 110, then this application is configured to locally provide the user interface and at least some of the functionalities with the application configured to communicate with the networked system 102, on an as needed basis, for data and/or processing capabilities not locally available (e.g., access to a database of items available for sale, to authenticate a user, to verify a method of payment). Conversely if the e-commerce site application is not included in the client device 110, the client device 110 may use its web browser to access the e-commerce site (or a variant thereof) hosted on the networked system 102.

One or more users 106 may be a person, a machine, or other means of interacting with the client device 110. In example embodiments, the user 106 is not part of the network architecture 100, but interacts with the network architecture 100 via the client device 110 or other means. For instance, the user 106 provides input (e.g., touch screen input or alphanumeric input) to the client device 110 and the input is communicated to the networked system 102 via the network 104. In this instance, the networked system 102, in response to receiving the input from the user 106, communicates information to the client device 110 via the network 104 to be presented to the user 106. In this way, the user 106 can interact with the networked system 102 using the client device 110.

An application program interface (API) server 120 and a web server 122 are coupled to, and provide programmatic and web interfaces respectively to, one or more application servers 140. The application servers 140 hosts one or more publication systems 142 and payment systems 144, each of which may comprise one or more modules or applications and each of which may be embodied as hardware, software, firmware, or any combination thereof. The application servers 140 are, in turn, shown to be coupled to one or more database servers 124 that facilitate access to one or more information storage repositories or database(s) 126. In an example embodiment, the databases 126 are storage devices that store information to be posted (e.g., publications or listings) to the publication system 142. The databases 126 may also store digital item information in accordance with example embodiments.

Additionally, a third party application 132, executing on third party server(s) 130, is shown as having programmatic access to the networked system 102 via the programmatic interface provided by the API server 120. For example, the third party application 132, utilizing information retrieved from the networked system 102, supports one or more features or functions on a website hosted by the third party. The third party website, for example, provides one or more promotional, publication, or payment functions that are supported by the relevant applications of the networked system 102.

The publication systems 142 provide a number of publication functions and services to users 106 that access the networked system 102. The payment systems 144 likewise provide a number of functions to perform or facilitate payments and transactions. While the publication system 142 and payment system 144 are shown in FIG. 1 to both form part of the networked system 102, it will be appreciated that, in alternative embodiments, each system 142 and 144 may form part of a payment service that is separate and distinct from the networked system 102. In some embodiments, the payment systems 144 may form part of the publication system 142.

The retarget system 150 provides functionality operable to cause content to be displayed to users that have performed actions with respect to a web service hosted by the application servers 140. In doing so, the retarget system 150 may access the user data from the databases 126. In some example embodiments, the retarget system 150 may communicate with the publication systems 142 and third party servers 130. In an alternative embodiment, the retarget system 150 may be a part of the publication system 142.

Further, while the client-server-based network architecture 100 shown in FIG. 1 employs a client-server architecture, the present inventive subject matter is of course not limited to such an architecture, and could equally well find application in a distributed, or peer-to-peer, architecture system, for example. The various publication system 142, payment system 144, and retarget system 150 could also be implemented as standalone software programs, which do not necessarily have networking capabilities.

The web client 112 accesses the various publication and payment systems 142 and 144 via the web interface supported by the web server 122. Similarly, the programmatic client 116 accesses the various services and functions provided by the publication and payment systems 142 and 144 via the programmatic interface provided by the API server 120. The programmatic client 116 may, for example, be a seller application (e.g., the Turbo Lister application developed by eBay® Inc., of San Jose, California) to enable sellers to author and manage listings on the networked system 102 in an off-line manner, and to perform batch-mode communications between the programmatic client 116 and the networked system 102.

Figure 2:
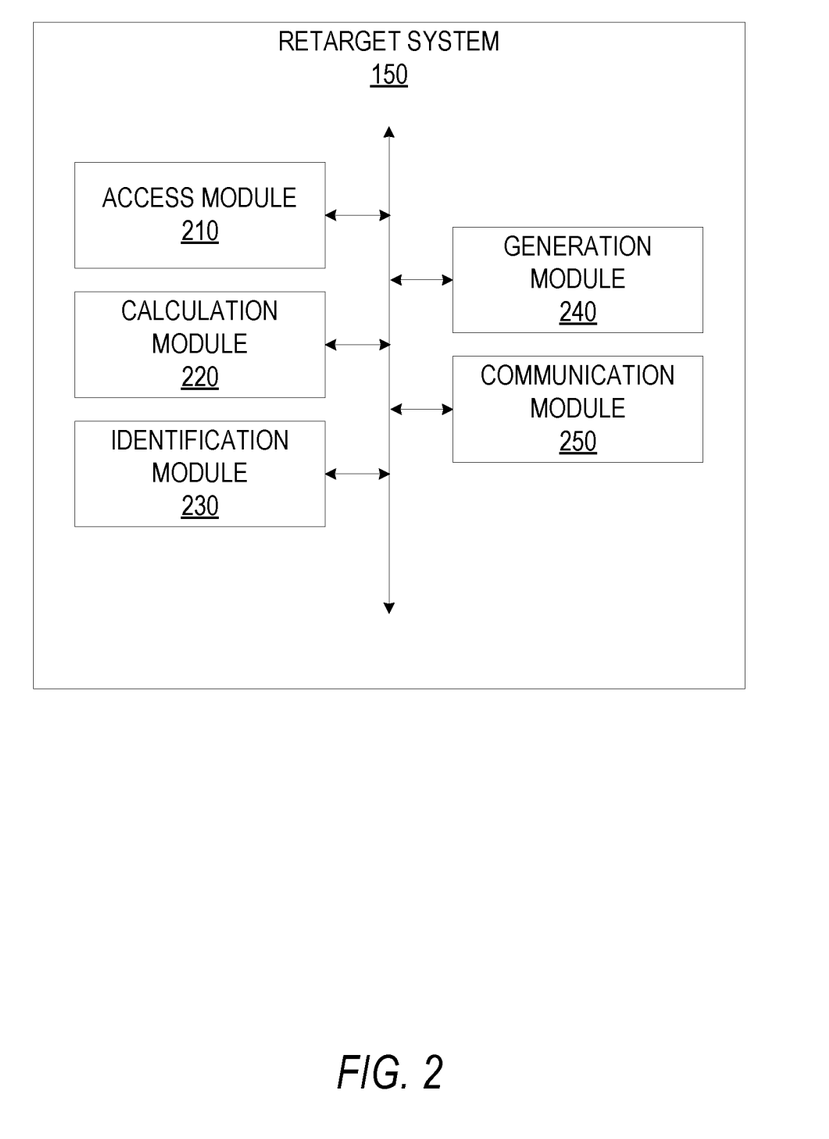
FIG. 2 is a block diagram illustrating components of a retarget system, according to some example embodiments.

FIG. 2 is a block diagram illustrating components of the retarget system 150, according to some example embodiments. The retarget system 150 is shown as including an access module 210, a calculation module 220, an identification module 230, a generation module 240, and a communication module 250, all configured to communicate with each other (e.g., via a bus, shared memory, or a switch). Any one or more of the modules described herein may be implemented using hardware (e.g., one or more processors of a machine) or a combination of hardware and software. For example, any module described herein may configure a processor (e.g., among one or more processors of a machine) to perform the operations described herein for that module. Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

In various example embodiments, the access module 210 is configured to access user information corresponding to users of a web service. In some instances, the web service is hosted by the application server 140. The web service publishes items that are available for sale to users of the web service (e.g., via the publication systems 142). Example web services include an online marketplace where users are enabled to browse items available for sale and purchase items from the online marketplace. The user information may be stored in a database 126 that is maintained by a database server 124. Accordingly, the access module 210 may access the user information from the database. The user information may include registration data provided by the user. For instance, when users register or create a user account with the web service, they may provide the demographic and financial information about themselves which gets stored in the database. The user information may also include user activity of the users with the web service (e.g., actions of the user with respect to the web service). For example, the user information may include items purchased by the users of the web service. The user information in some instances also indicates whether users of the web service have interacted with an item or browsed a particular item.

In various example embodiments, the calculation module 220 is configured to calculate scores for each of the users based on the user information. The calculated scores may reflect an estimated value of each of the users with respect to content related to the web service (e.g., such as an advertisement for product that is published as being available for sale). Further, in some instances, the calculation module 220 uses a model or an algorithm to calculate the scores for each of the users. As an example, the calculation module 220 uses a gradient boosting tree in order to predict and calculate the scores for each of the users. In some cases the estimated value represents expected revenue per click, such as an amount of revenue generated each time the user clicks on the content. In some cases, the estimated value represents a conversion rate of the user (e.g., rate at which the users are converted to become paying customers of the web service).

In various example embodiments, the identification module 230 is configured to identify select users using the calculated score. For instance, the identification module 230 will identify users from the users of the web service that have a score greater than a predetermined threshold.

In various example embodiments, the generation module 240 is configured to generate a data object. The data object may be placed within a client device (e.g., client device 110). Further, the data object is used as an indicator during communication between the client device and any of the servers over the network. For example, the third party application 132 within the third party server 130 can detect that the data object has been placed within the client device 110. Likewise, any of the systems within the application servers 140 are able to detect that the data object has been placed within the client device.

In further embodiments, the generation module 240 is to generate the content related to the web service. The content related to the web service will include advertisements for items available for purchase from the web service. The content may also include promotional messages about a sale of items available for purchase from the web service. Effectively, the content related to the web service indicates products or items that are published by the web service as being available for sale.

In further embodiments, the generation module 240 is to generate a bid request that is to be sent to a publication server. The bid request may be a monetary value that the retarget system will pay the publication server to display the content related to the web service.

In various example embodiments, the communication module 250 is configured to send the data object to the client devices of the select users. The communication module 250 is further to cause display of the content related to the web service. This may include the communication module 250 sending the generated content to a third party server or a publication server which will display the generated content to the client devices of the select users.

In various example embodiments, the communication module 250 is further configured to receive an assessment of the identified select users from a publication server. The received assessment, in some instances, measures an actual value of each of the identified select users with respect to the content related to the web service. The actual value may be expressed as an amount of revenue that can be made with the identified select users.

Figure 3:
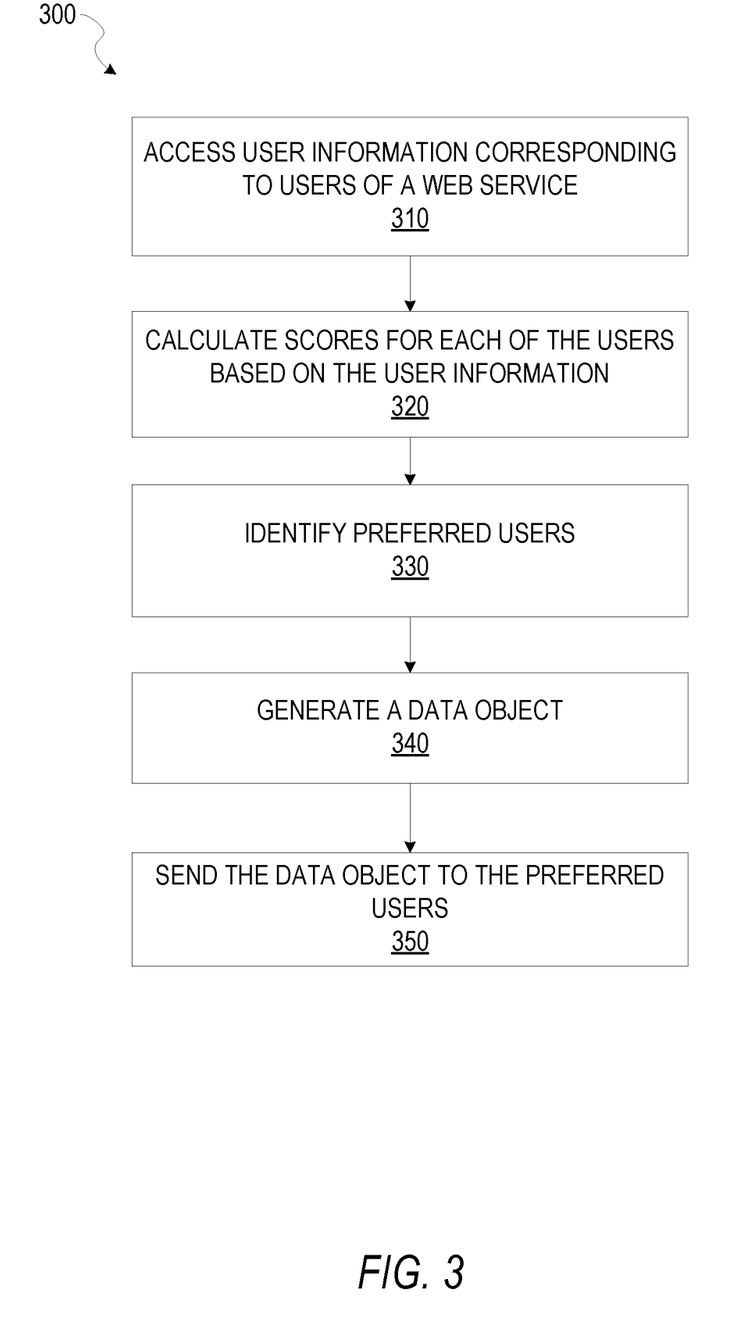
FIG. 3-5 are flowcharts illustrating operations of the retarget system in performing a method of transmitting a data object, according to some example embodiments.
Figure 4:
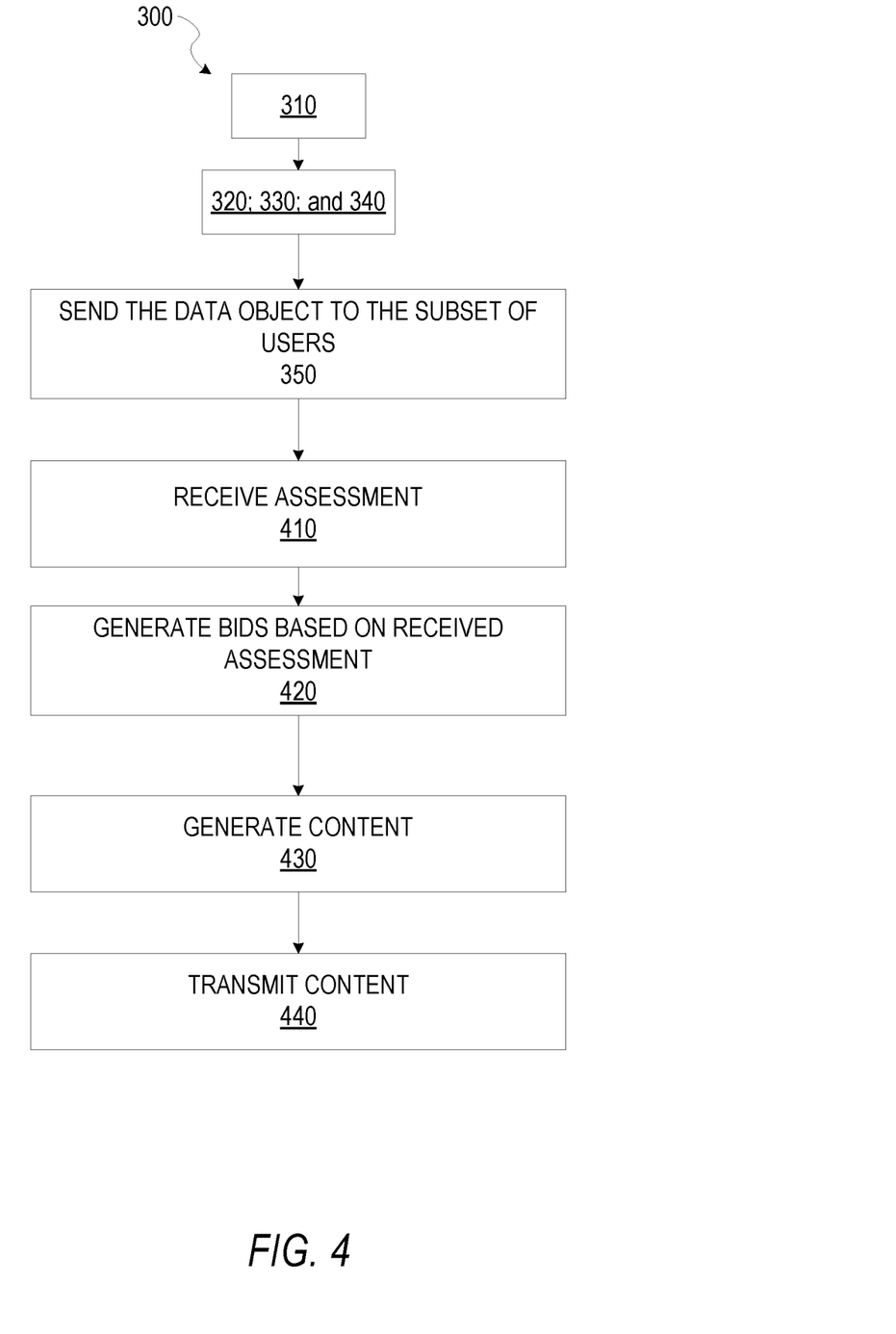
Figure 5:
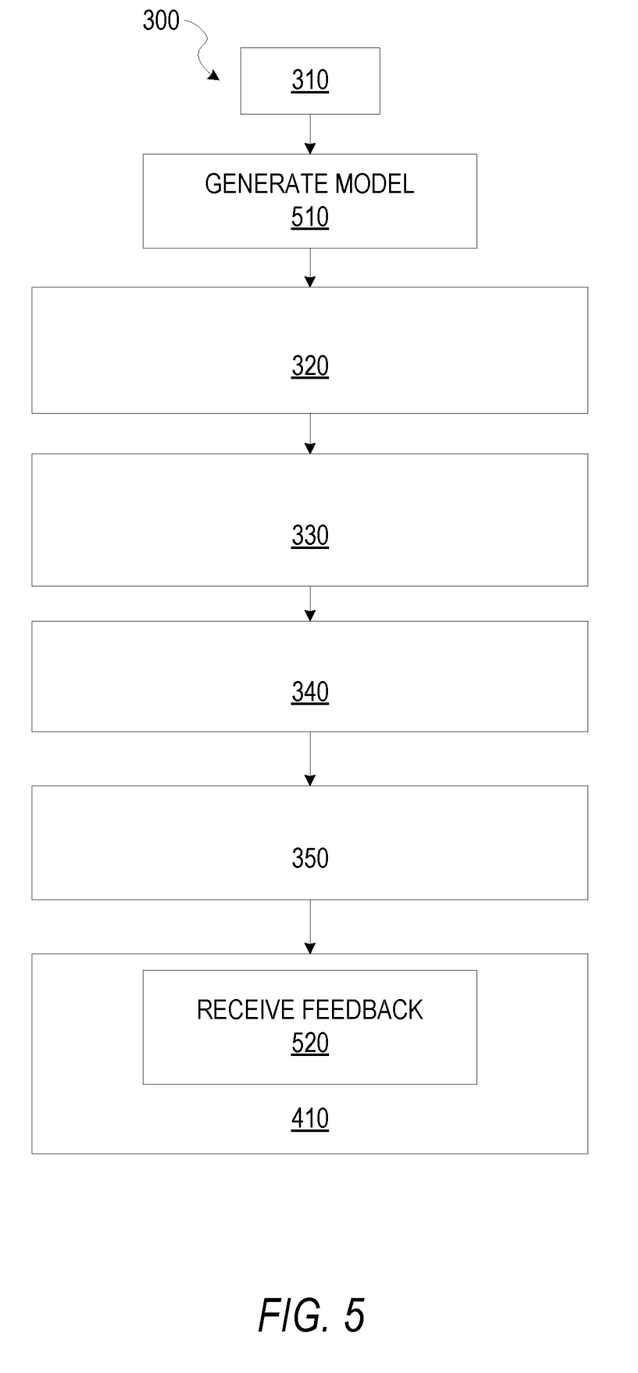

FIG. 3-5 are flowcharts illustrating operations of the retarget system 150 in performing a method 300 of transmitting a data object, according to some example embodiments. Operations in the method 300 may be performed by the retarget system 150, using modules described above with respect to FIG. 2. As shown in FIG. 3, the method 300 includes operations 310, 320, 330, 340, and 350.

At operation 310, the access module 210 accesses user information corresponding to users of a web service. The user information is retrieved by the access module 210 from a database. The web service includes listings of products are available for sale. The users of the web service may include registered buyers that purchase the products from the web service. The products may be provided by the web service, in some embodiments. Alternatively, the products are provided by other users of the web service that are registered sellers.

In some instances, the access module 210 stores the user information in the database once a user has registered with the web service. For example, when the user registers an account (e.g., buyer or seller) with the web service, the user provides information for registration, which is stored in the database by the access module 210. As a result, the access module 210 is further to receive a portion of the user information during a registration process conducted by each of the users with the web service. Further, the access module 210, in some embodiments, detects actions of the user with respect to the web service and subsequently stores it in the database. Actions of the user with respect to the web service includes requests received from the users of the web service. The requests are received by the user either acting as a buyer or a seller of the product.

For example, the access module 210 receives requests from a device operated by the user. The request may include viewing a product listing or clicking on a picture. The request may also include listing on the web service a product as being available for sale. The access module 210 groups the received requests and stores in the database as user information for that particular user.

Further, the web service may display item pages of items available for sale. As the user is browsing through each item page, the access module 210 will track the user activity and subsequently store it in the database. For example, the user may click on an image of an item. As another example, the user may enter a search query for a particular set of items. Each of these actions may be stored as user information within the database.

At operation 320, the calculation module 220 calculates scores for each of the users based on the user information. In performing the calculation, the calculation module 220 considers all of the user information (e.g., information provided upon user registration, and the actions taken by user with the web service). The calculated scores reflect an estimated value of each of the users with respect to content related to the web service. In some instances, the content related to the web service includes advertisements for the products or services that are listed on the web service as being available for sale. The content includes pictures, descriptions, videos, that correspond to the products or services sold through the web service. In some instances, the content is received from a seller of the product or service. Alternatively, the content may be generated by the retarget system 150, as further explained below.

In some instances, the calculated scores include conversion statistics that indicate a likelihood of the users to purchase products listed on the web service. For example, the value represents a conversion rate of the user (e.g., a rate at which the users are converted to become paying customers of the web service). Users with higher conversion rates will be more receptive to the content related to the web service. In various example embodiments, the calculation module 220 uses a predictive model to calculate the scores, as further explained below. Moreover, the predictive model may be generated such that users who are actively using the web service will receive a higher calculated score as compared to users who infrequently browse the web service.

At operation 330, the identification module 230 identifies select users from the users of the web service. In doing so, the identification module 230 analyzes the calculated scores to identify the select users. Accordingly, the select users are users that have expressed a threshold amount of interest in the web service. In various example embodiments, the identification module 230 identifies users that have a calculated score greater than a predetermined threshold (e.g., a conversion rate of at least 50%) as being select users. The predetermined threshold, in some instances, is set by the retarget system 150 in order to identify the select users. Further, the predetermined threshold may be adjusted by the identification module 230 based on a desired number of select users. For example, if the number of select users is too small because the predetermined threshold is set too high, then the predetermined threshold is lowered so that more users will be identified as select users.

At operation 340, the generation module 240 generates a data object for each of the select users identified at the operation 330. In some instances, the data object is placed within the client devices of the select users. Further, the data object serves as an indicator to a publication server or any other third party servers that the device is being operated by a select user. For example, the data object is a cookie that is used to indicate that the user was identified at the operation 330 as having a score greater than the predetermined threshold. In further embodiments, the generated data object includes the user information of the select user (e.g., information that was provided upon registration or actions performed by that user with the web service).

At operation 350, the communication module 250 transmits the generated data object to client devices operated by the select users. Effectively, each of the select users receives a copy of the generated object in their respective client device. In some instances, since the generated data object indicates actions of that user with respect the web service, the generated data object that is transmitted to a first user includes information that is different than the generated data object that is transmitted to a second user. Once the generated data object is transmitted, it may be temporarily stored in the client device. Further, the data object serves as an indicator to a publication server or any other third party servers. In other words, the data object is detectable by the publication server during communication with the publication server by the client device.

As shown in FIG. 4, the method 300 include operations 410, 420, 430, and 440. The operations 410-440 may be performed subsequent to the operation 350 of FIG. 3.

At operation 410, the communication module 250 receives, from the publication server, an assessment of the identified select users. In some instances, the assessment measures an actual value of the select users with respect to the content that indicates products or services available from the web service (e.g., advertisements for the products or services available from the web service). In some instances, the publication server determines the assessment based on the information included in the generated data object that is detected in the communication with the client device. For example, based on the actions of the user with respect to the web service, the publication server is able to determine the actual value of the select users with respect to the content from the web service. In some instances, the assessment is a numerical value that indicates the value of the select user to the web service (e.g., an amount of revenue). In other instances, the assessment may be feedback that describes the value of the select user to the web service, as further explained below. In some instances, the communication module 250 receives a value for each user among the identified select users. Accordingly, the value for a first user may be different from the value for a second user.

At operation 420, the generation module 240 generates a bid request based on the received assessment. In some instances, the generation module 240 generates a bid request for each user among the select users. Moreover, the bid request indicates a monetary value that the retarget system will pay the publication server to display content to a particular select user. As a result, a select user that is determined to be highly valuable to the web service will have a higher bid. Accordingly, a select user that is determined to be less valuable to the web service will have a lower bid. Effectively, the generation module 240 generates the bid request based on the received assessment of the select user. In various example embodiments, once the bid request is generated, the communication module 250 transmits the generated bid request to the publication server. In various example embodiments, once the generated bid request is received by the publication server, the publication server sends an indication to the retarget system 150, the indication being that the bid request is accepted by the publication server.

At operation 430 the generation module 240 generates content that indicates products available from the web service. The generated content may be similar to content that the user has already viewed when browsing the web service (e.g., the actions of the user with respect to the web service). As an example, if the user previously searched for beds from the web service, the generated content include similar beds from the web service. Alternatively, the generated content may include further content that is different from the content that the user has already viewed when browsing the web service. Following the same example, if the user previously search for beds from the web service, the generated content includes other items that complement the searched beds from the web service.

At operation 440, the communication module 250 transmits the content that indicates the products available from the web service. The content is transmitted to the client devices of the select users. In various example embodiments, the publication server causes display of the transmitted content that indicates the products available from the web service. Accordingly, in some embodiments, the communication module 250 transmits the content to the publication server. The communication module 250 transmits the content based on the indication received from the publication server of the accepted bid request. In some instances, the transmitted content is displayed on the client devices of the select users while the select user is browsing content that is unrelated to the products available from the web service. In other words, the select user may be checking their email when the transmitted content is displayed. Accordingly, the transmitted content is displayed alongside the browsed content that is unrelated to the products available from the web service.

As shown in FIG. 5, the method 300 includes 510 and 520. The operation 510 may be performed prior to the operation 320 (e.g., precursor task). The operation 520 may be performed as part of the operation 410 (e.g., subroutine task).

At operation 510, the generation module 240 generates a predictive model that utilizes the user information corresponding to users of the web service. The predictive model is used by the calculation module 220 to calculate the scores for each of the users, as performed at operation 320. In other words, the calculating of the scores by the calculation module 220 is based on the generated predictive model. In some instances, the predictive model is calibrated with the user information corresponding to the users of the web service. More particularly, the generation module 240 analyzes the user information to determine the content that the users viewed from the web service (e.g., products and/or services, pictures, descriptions, and the like). The generation module 240 further analyzes the user information to determine the amount of content that was viewed by the users. Based on at least these analyses, the generation module 240 calibrates the predictive model with the analyzed data. Once calibrated, the predictive model determines a score for a user based on the user information for that user.

At operation 520, the communication module 250 receives feedback from the publication server. The operation 520 may be performed as part of the operation 410. In some instances, the received feedback includes comments that indicate a value of the select user to the web service (e.g., the content provided by the web service). For example, the comments may indicate a frequency at which that the select user purchases products from the web service.

Figure 6:
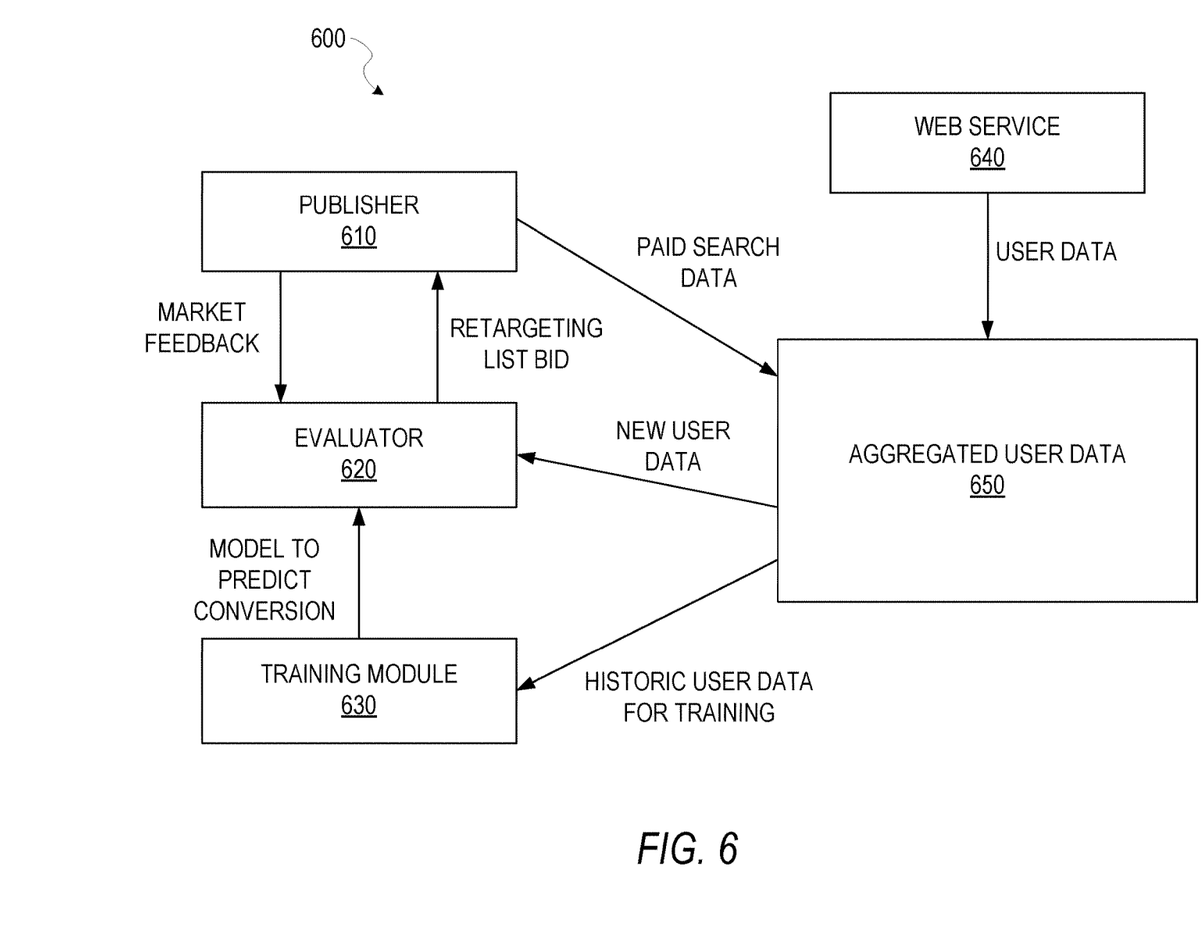
FIG. 6 is a flowchart illustrating an example of dataflow within a retarget system, according to some example embodiments.

FIG. 6 is a flowchart illustrating an example of dataflow within a retarget system, according to some example embodiments. As shown, FIG. 6 includes a publisher 610, an evaluator 620, a training module 630, a web service 640, and aggregated user data 650. The web service 640 publishes items that are available for sale to users of the web service 640. The web service 640 also stores user data or information corresponding to users of the web service. The information corresponding to the users of the web service is represented by the aggregated user data 650.

The user data 650 is sent to the training module 630 in order to predict or calculate a conversion rate for each of the users of the web service. In some instances, the training module 630 is analogous to the calculation module 220 of FIG. 2. The evaluator 620 may also utilize the calculated conversion rates to select a list of users for retargeting. The list of users may each have a cookie placed within their devices in order to serve as an indicator to the publisher 610. The publisher 610 may be a server that maintains a web page and provides content to users that browse the web page. Moreover, the evaluator 620 may receive feedback on each of the list of users regarding their actual value with regards to content related to the publisher (e.g., content related to or provided by the web service to the publisher). In various example embodiments, the actual value is be expressed as an amount of revenue that can be generated from purchased made by the identified select users. Based on the feedback, a bid request may be submitted by the web service 640 to the publisher 610 in order for the publisher 610 to present content related to the web service to the list of users.

Figure 7:
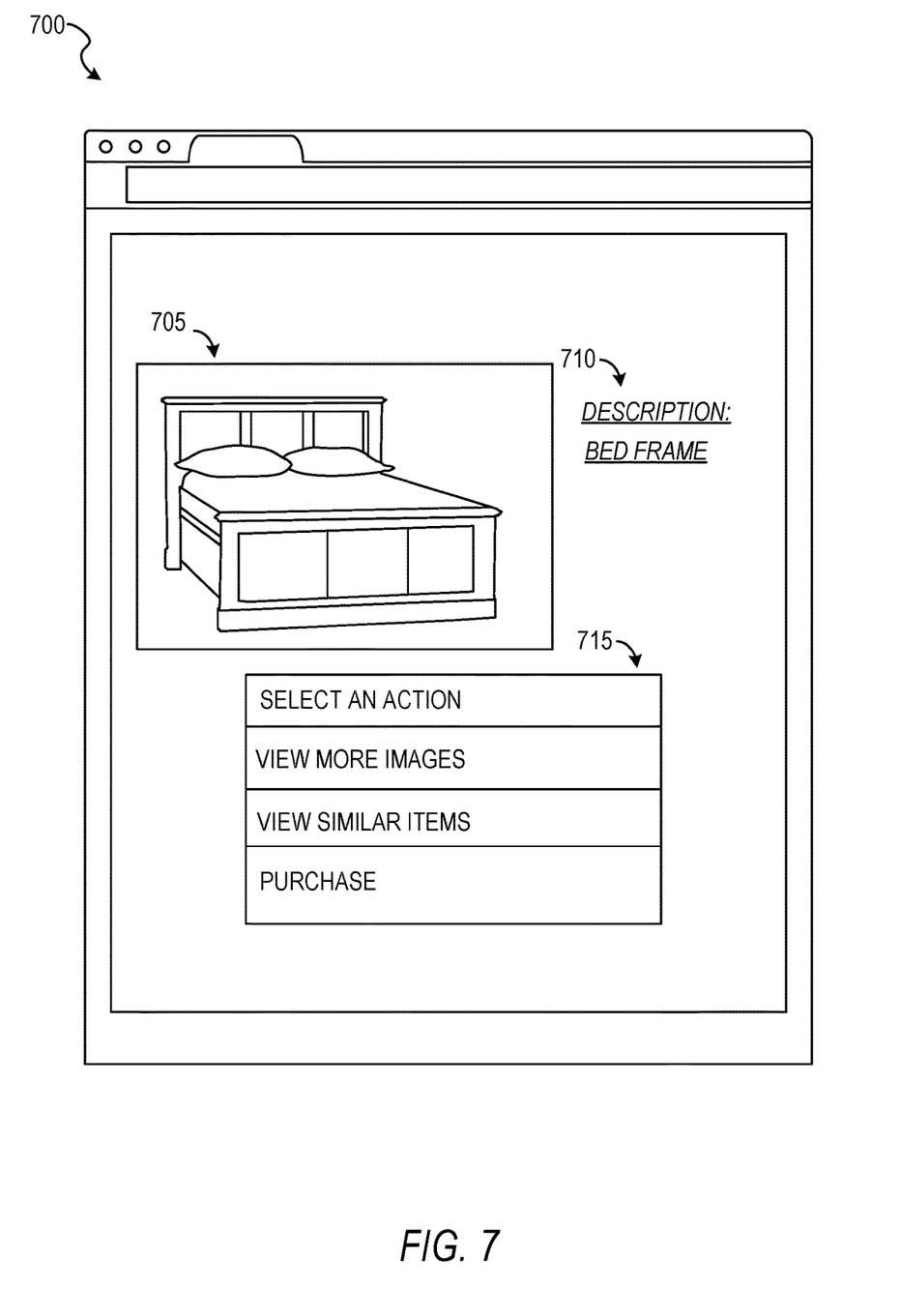
FIG. 7 is a user interface that depicts an item available for sale by a web service, according to some example embodiments.

FIG. 7 is a user interface 700 that depicts an item that is published by the web service as being available for sale, according to some example embodiments. As stated earlier, the web service includes an online marketplace where items are made available for sale. The user interface 700 may include an image 705 of an item, and a description 710 of the item. The user interface 700 further includes a menu 715 that is selectable to perform actions with respect to the item. For example, from the menu 715 the user may select an action to perform a further search on items that are similar to the item shown in the user interface 700. The user may also select an action to view more images of the item. The user may also select an action to purchase the item. Further, the user interface 700 may be displayed on a client device operated by a user. Any actions performed by the user on the user interface 700 may be tracked and stored as user information. For example, if the user decides to purchase the item, this action may be stored as user information. For example, if the user is browsing for beds initially, the generated content may include information regarding the beds as well as accessories for the bed.

Figure 8:
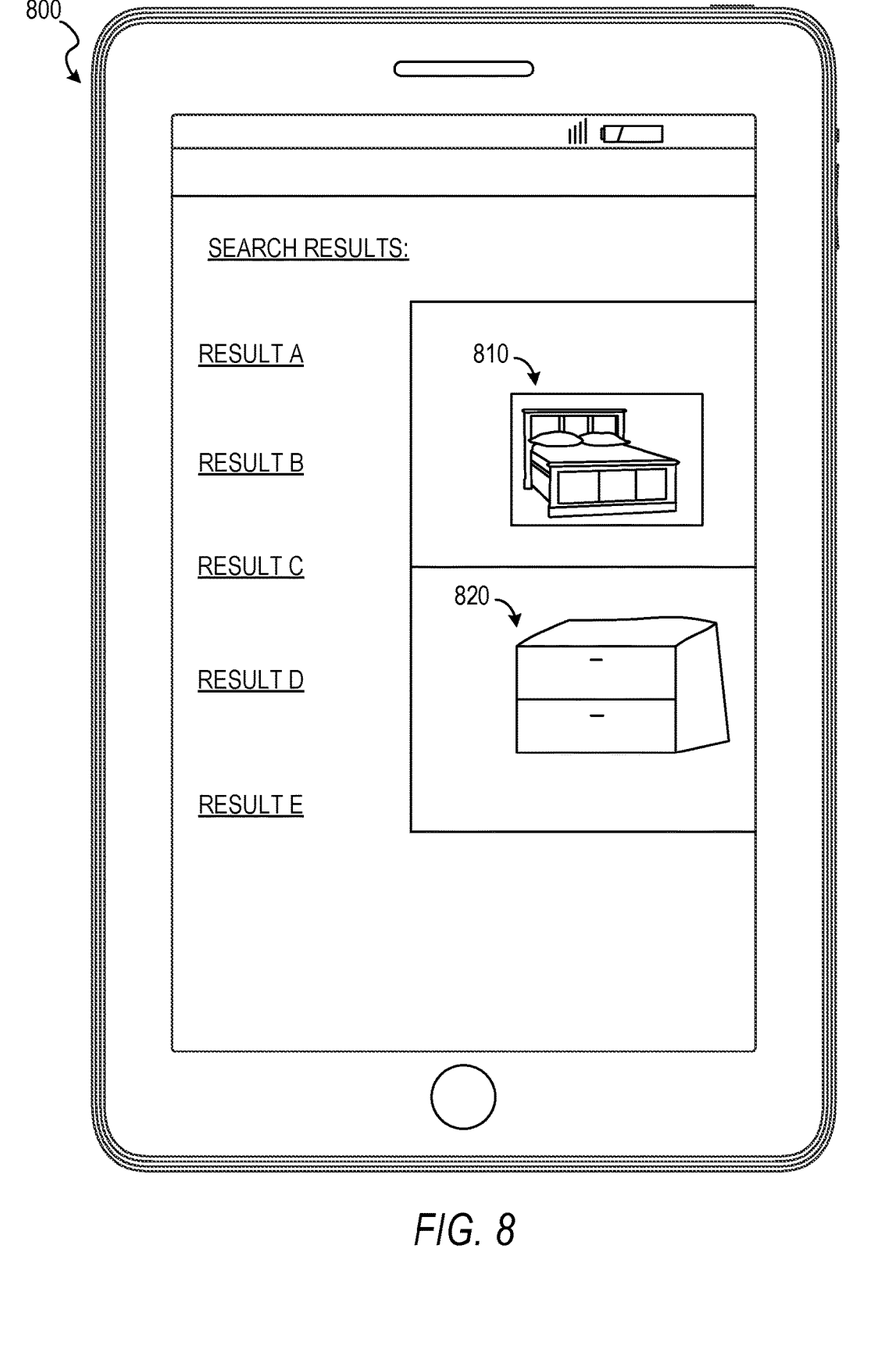
FIG. 8 is a user interface that depicts content that indicates products from a web service, according to some example embodiments.

FIG. 8 is a user interface 800 that depicts content related to the web service, according to some example embodiments. The user interface 800 may be displayed on a client device operated by a user. Also included in the user interface 800 is content 810 related to the web service. The content 810 that relates to the web service is generated by the retarget system 150 and transmitted to the publication server. Moreover, the publication server may cause the user interface 800 to be displayed on the client device. The content 810 relates to the item displayed in the user interface 700 of FIG. 7. The user may have performed an action with respect the item displayed in the user interface 700 of FIG. 7, which causes the content 810 to be displayed on the client device. The user interface 800 may also include further content 820 that relates to the web service. For example, the further content 820 depicts an item that corresponds to the item displayed in the user interface 700 of FIG. 7 (e.g., a complementary item).

Modules, Components, and Logic

Certain embodiments are described herein as including logic or a number of components, modules, or mechanisms. Modules may constitute either software modules (e.g., code embodied on a machine-readable medium) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a Field-Programmable Gate Array (FPGA) or an Application Specific Integrated Circuit (ASIC). A hardware module may also include programmable logic or circuitry that is temporarily configured by software to perform certain operations. For example, a hardware module may include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Example Machine Architecture and Machine-Readable Medium

Figure 9:
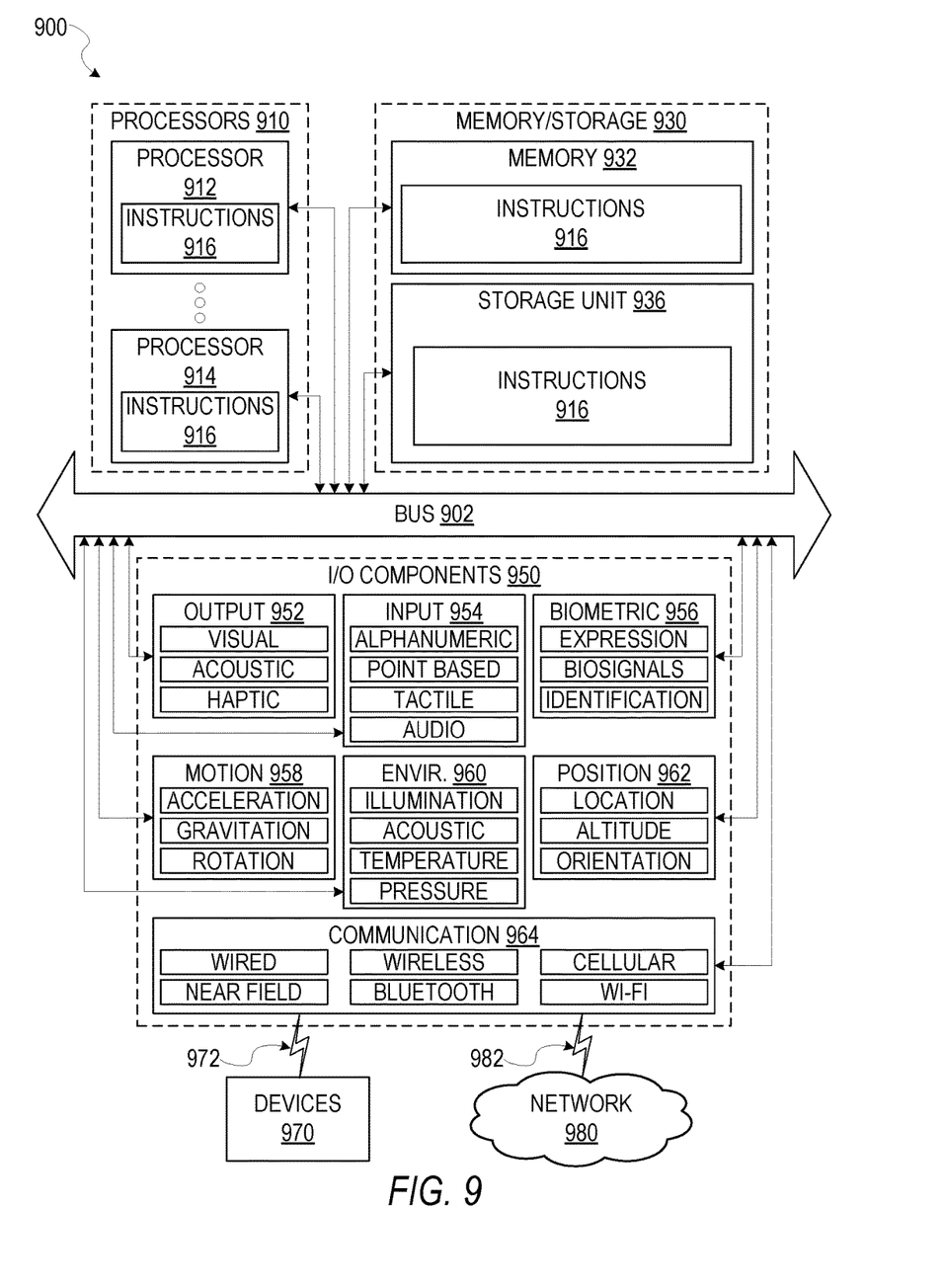
FIG. 9 illustrates a diagrammatic representation of a machine in the form of a computer system within which a set of instructions may be executed for causing the machine to perform any one or more of the methodologies discussed herein, according to an example embodiment.

FIG. 9 is a block diagram illustrating components of a machine 900, according to some example embodiments, able to read instructions from a machine-readable medium (e.g., a machine-readable storage medium) and perform any one or more of the methodologies discussed herein. Specifically, FIG. 9 shows a diagrammatic representation of the machine 900 in the example form of a computer system, within which instructions 916 (e.g., software, a program, an application, an applet, an app, or other executable code) for causing the machine 900 to perform any one or more of the methodologies discussed herein may be executed. For example the instructions may cause the machine to execute the flow diagrams of FIGS. 3-5. Additionally, or alternatively, the instructions may implement the modules of FIG. 2, and so forth. The instructions transform the general, non-programmed machine into a particular machine specially configured to carry out the described and illustrated functions in the manner described. In alternative embodiments, the machine 900 operates as a standalone device or may be coupled (e.g., networked) to other machines. In a networked deployment, the machine 900 may operate in the capacity of a server machine or a client machine in a server-client network environment, or as a peer machine in a peer-to-peer (or distributed) network environment. The machine 900 may comprise, but not be limited to, a server computer, a client computer, a personal computer (PC), a tablet computer, a laptop computer, a personal digital assistant (PDA), an entertainment media system, a smart phone, a mobile device, a wearable device (e.g., a smart watch), a smart home device (e.g., a smart appliance), other smart devices, a web appliance, a network router, a network switch, a network bridge, or any machine capable of executing the instructions 916, sequentially or otherwise, that specify actions to be taken by machine 900. Further, while only a single machine 900 is illustrated, the term "machine" shall also be taken to include a collection of machines 900 that individually or jointly execute the instructions 916 to perform any one or more of the methodologies discussed herein.

The machine 900 may include processors 910, memory 930, and I/O components 950, which may be configured to communicate with each other such as via a bus 902. In an example embodiment, the processors 910 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, processor 912 and processor 914 that may execute instructions 916. The term "processor" is intended to include multi-core processor that may comprise two or more independent processors (some-times referred to as "cores") that may execute instructions contemporaneously. Although FIG. 9 shows multiple processors, the machine 900 may include a single processor with a single core, a single processor with multiple cores (e.g., a multi-core process), multiple processors with a single core, multiple processors with multiples cores, or any combination thereof.

The memory/storage 930 may include a memory 932, such as a main memory, or other memory storage, and a storage unit 936, both accessible to the processors 910 such as via the bus 902. The storage unit 936 and memory 932 store the instructions 916 embodying any one or more of the methodologies or functions described herein. The instructions 916 may also reside, completely or partially, within the memory 932, within the storage unit 936, within at least one of the processors 910 (e.g., within the processor's cache memory), or any suitable combination thereof, during execution thereof by the machine 900. Accordingly, the memory 932, the storage unit 936, and the memory of processors 910 are examples of machine-readable media.

As used herein, "machine-readable medium" means a device able to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions 916. The term "machine-readable medium" shall also be taken to include any medium, or combination of multiple media, that is capable of storing instructions (e.g., instructions 916) for execution by a machine (e.g., machine 900), such that the instructions, when executed by one or more processors of the machine 900 (e.g., processors 910), cause the machine 900 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

Furthermore, the machine-readable medium is non-transitory in that it does not embody a propagating signal. However, labeling the tangible machine-readable medium as "non-transitory" should not be construed to mean that the medium is incapable of movement—the medium should be considered as being transportable from one physical location to another. Additionally, since the machine-readable medium is tangible, the medium may be considered to be a machine-readable device.

The I/O components 950 may include a wide variety of components to receive input, provide output, produce output, transmit information, exchange information, capture measurements, and so on. The specific I/O components 950 that are included in a particular machine will depend on the type of machine. For example, portable machines such as mobile phones will likely include a touch input device or other such input mechanisms, while a headless server machine will likely not include such a touch input device. It will be appreciated that the I/O components 950 may include many other components that are not shown in FIG. 9. The I/O components 950 are grouped according to functionality merely for simplifying the following discussion and the grouping is in no way limiting. In various example embodiments, the I/O components 950 may include output components 952 and input components 954. The output components 952 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 954 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 950 may include biometric components 956, motion components 958, environmental components 960, or position components 962 among a wide array of other components. For example, the biometric components 956 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 958 may include acceleration sensor components (e.g., accelerometer), gravitation sensor components, rotation sensor components (e.g., gyroscope), and so forth. The environmental components 960 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 962 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 950 may include communication components 964 operable to couple the machine 900 to a network 980 or devices 970 via coupling 982 and coupling 972 respectively. For example, the communication components 964 may include a network interface component or other suitable device to interface with the network 980. In further examples, communication components 964 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 970 may be another machine or any of a wide variety of peripheral devices (e.g., a peripheral device coupled via a Universal Serial Bus (USB)).

Moreover, the communication components 964 may detect identifiers or include components operable to detect identifiers. For example, the communication components 964 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 964, such as, location via Internet Protocol (IP) geo-location, location via Wi-Fi® signal triangulation, location via detecting a NFC beacon signal that may indicate a particular location, and so forth.

Transmission Medium

In various example embodiments, one or more portions of the network 980 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 980 or a portion of the network 980 may include a wireless or cellular network and the coupling 982 may be a Code Division Multiple Access (CDMA) connection, a Global System for Mobile communications (GSM) connection, or other type of cellular or wireless coupling. In this example, the coupling 982 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

The instructions 916 may be transmitted or received over the network 980 using a transmission medium via a network interface device (e.g., a network interface component included in the communication components 964) and utilizing any one of a number of well-known transfer protocols (e.g., hypertext transfer protocol (HTTP)). Similarly, the instructions 916 may be transmitted or received using a transmission medium via the coupling 972 (e.g., a peer-to-peer coupling) to devices 970. The term "transmission medium" shall be taken to include any intangible medium that is capable of storing, encoding, or carrying instructions 916 for execution by the machine 900, and includes digital or analog communications signals or other intangible medium to facilitate communication of such software.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method comprising:

accessing, over a computer network and from a web server computing device, user information corresponding to users of a web service;

calculating scores for each of the users based on the user information, the scores indicating an estimated value of each of the users with respect to content that indicates products available for sale from the web service;

identifying select users of the web service based on the calculated scores, the select users each having a score greater than a predetermined threshold;

in response to the identifying of the select users, generating, using one or more processors, a data object for each of the select users, the data object being a selectively transmitted data object that is an indicator, to a publication server, that identifies a respective user of the select users as being chosen as one of the select users of the web service for having the score greater than the predetermined threshold; and in response to the generating of the data object, transmitting, over the computer network, the generated data object to client devices operated by the select users.

2. The method of claim 1, further comprising receiving, from the publication server, an assessment of the identified select users based on score information within the generated data object, the received assessment measuring an actual value of the identified select users with respect to an amount of money that is estimated to be made from the identified select users upon purchasing products available from the web service.

3. The method of claim 2, further comprising:
generating a bid request based on the received assessment; and
transmitting the bid request to the publication server.

4. The method of claim 1, wherein the data object is detectable by the publication server during communication between the client devices of the select users and the publication server.

5. The method of claim 1, further comprising:
generating the content that indicates the products available from the web service; and
transmitting the generated content to the publication server that causes display of the generated content on the client devices operated by the select users.

6. The method of claim 5, further comprising:
receiving, from the publication server, an indication that a bid request is accepted by the publication server; and
wherein the transmitting the generated content to the publication server is based on the received indication.

7. The method of claim 1, wherein the calculated scores include conversion statistics that indicate a likelihood of the users to purchase products listed on the web service.

8. The method of claim 1, wherein the user information includes actions of the users with respect to the web service.

9. The method of claim 1, further comprising:
generating a predictive model that utilizes the user information corresponding to the users of the web service; and wherein the calculating the scores is based on the generated predictive model.

10. The method of claim 1, wherein the accessing the user information includes receiving a portion of the user information during a registration process conducted by each of the users with the web service.

11. A system comprising:
one or more processors and executable instructions accessible on a computer-readable medium that, when executed, configures the one or more processors to at least:
access, over a computer network and from a web server computing device, user information corresponding to users of a web service;
calculate scores for each of the users based on the user information, the scores indicating an estimated value of each of the users with respect to content that indicates products available for sale from the web service;
identify select users of the web service based on the calculated scores, the select users each having a score greater than a predetermined threshold;
in response to the identifying of the select users, generate, a data object for each of the select users, the data object being a selectively transmitted data object that is an indicator, to a publication server, that a respective user of the select users was selected as one of the select users of the web service;
in response to the generating of the data object, transmitting, over the computer network, the generated data object to client devices operated by the select users; and
based at least on analyzing the data object and user action data made from the web service, cause display, to each of the client devices of the select users, generated content corresponding to advertisements of products that are listed for sale from the web service.

12. The system of claim 11, wherein the one or more processors are further configured to receive, from the publication server, an assessment of the identified select users, the received assessment measuring an actual value of the identified select users with respect to the content that indicates products available from the web service, wherein the assembling of the generated content is based at least on the assessment of the actual value of the identified select users.

13. The system of claim 12, wherein the one or more processors are further configured to:
generate a bid request based on the received assessment; and
transmit the bid request to the publication server.

14. The system of claim 11, wherein the data object is detectable by the publication server during communication between the client devices of the select users and the publication server.

15. The system of claim 11, wherein the one or more processors are further configured to:
transmit the generated content to the publication server that causes the display of the generated content on the client devices operated by the select users.

16. The system of claim 11, wherein the one or more processors are further configured to:
receive, from the publication server, an indication that a bid request is accepted by the publication server; and
transmit the generated content to the publication server based on the received indication.

17. The system of claim 11, wherein the calculated scores include conversion statistics that indicate a rate at which the users are converted to become paying customers on the web service.

18. The system of claim 11, wherein the user information includes actions of the users with respect to the web service.

19. The system of claim 11, wherein the one or more processors are further configured to generate a predictive model that utilizes the user information corresponding to the users of the web service; and wherein the calculating the scores is based on the generated predictive model.

20. A non-transitory machine-readable medium storing instructions that, when executed by one or more processors of a machine, cause the machine to perform operations comprising:
accessing user information corresponding to users of a web service;
calculating scores for each of the users based on the user information, the scores indicating an estimated value of each of the users with respect to content that indicates products available for sale from the web service;
identifying select users of the web service based on the calculated scores, the select users each having a score greater than a predetermined threshold;
in response to the identifying of the select users, generating, using one or more processors, a data object for the select users, the data object being a selectively transmitted data object that is an indicator, to a publication server, that a respective user of the select users was selected as one of the select users of the web service;
and
in response to the generating of the data object, transmitting the generated data object to client devices operated by the select users.

\* \* \* \* \*